United States Patent
Tagawa et al.

(10) Patent No.: US 8,325,392 B2
(45) Date of Patent: *Dec. 4, 2012

(54) IMAGE READING DEVICE AND IMAGE FORMING DEVICE

(75) Inventors: Hirotoshi Tagawa, Osaka (JP); Masahiro Higashitani, Osaka (JP); Katsuhiko Okamoto, Osaka (JP); Yasuyuki Horiguchi, Osaka (JP); Kei Ouchi, Osaka (JP); Sou Takahashi, Osaka (JP)

(73) Assignee: Kyocera Document Solutions Inc., Osaka-Shi, Osaka (JP)

( * ) Notice: Subject to any disclaimer, the term of this patent is extended or adjusted under 35 U.S.C. 154(b) by 672 days.

This patent is subject to a terminal disclaimer.

(21) Appl. No.: 12/408,484

(22) Filed: Mar. 20, 2009

(65) Prior Publication Data
US 2009/0244654 A1 Oct. 1, 2009

(30) Foreign Application Priority Data

Mar. 28, 2008 (JP) .................................. 2008-087765

(51) Int. Cl.
*H04N 1/04* (2006.01)
(52) U.S. Cl. ......... 358/475; 358/474; 358/479; 358/484
(58) Field of Classification Search .................. 358/475, 358/474, 479, 484
See application file for complete search history.

(56) References Cited

U.S. PATENT DOCUMENTS

| 5,101,285 | A | 3/1992 | Kawai et al. |
| 5,430,289 | A * | 7/1995 | Erickson et al. ............. 250/205 |
| 6,469,808 | B1 | 10/2002 | Onishi et al. |
| 6,661,497 | B2 | 12/2003 | Tabata et al. |
| 7,349,133 | B2 | 3/2008 | Sugeta |
| 7,755,811 | B2 * | 7/2010 | Herloski et al. ............. 358/475 |
| 2005/0088707 | A1 | 4/2005 | Sakurai |

FOREIGN PATENT DOCUMENTS

| JP | H01-74660 U | 5/1989 |
| JP | H03-224354 | 10/1991 |
| JP | H09-247361 | 9/1997 |
| JP | 2002-314760 | 10/2002 |
| JP | 2002-314760 A | 10/2002 |
| JP | 2005-156600 | 6/2005 |
| JP | 2008-180841 | 8/2008 |

OTHER PUBLICATIONS

Notice of Reasons for Rejection issued to JP Application No. 2008-087765, mailed Feb. 28, 2012.
Notice of Reasons for Rejection issued to Japanese Application No. 2008-087765, mailed Aug. 14, 2012.

* cited by examiner

*Primary Examiner* — Houshang Safaipour
(74) *Attorney, Agent, or Firm* — Knobbe, Martens, Olson & Bear, LLP (57) ABSTRACT

An image reading device is provided. The image reading device suppresses uneven intensity of light emitted on a subject, by disposing a diffusion plate between the subject and a plurality of luminescence portions, and an image forming device that includes this image reading device. The image reading device includes an illumination portion that irradiates light onto a subject. The illumination portion includes: a plurality of LED's disposed at predetermined intervals in a main scanning direction; and an elliptical diffuser plate that is disposed between the subject and the plurality of LED's and diffuses light emitted by the plurality of LED's in a higher diffusion rate in the main scanning direction than in a sub-scanning direction.

10 Claims, 10 Drawing Sheets

IMAGE READING DEVICE AND IMAGE FORMING DEVICE

CROSS-REFERENCE TO RELATED APPLICATION

This application is based on and claims the benefit of priority from Japanese Patent Application No. 2008-087765 filed Mar. 28, 2008, the contents of which are incorporated herein by reference.

BACKGROUND OF THE DISCLOSURE

1. Field

The present disclosure relates to an image reading device and an image forming device including an image reading device.

2. Related Art

Conventionally, an image reading device for reading an image of a subject has been known, including an illumination portion for irradiating light onto a subject, a mirror for reflecting light from the subject and forming a light path, an imaging lens for forming an image from a luminous flux from the subject, and a CCD (charge-coupled device) for reading an image of the subject formed by the imaging lens.

A light emitting device such as an LED (light-emitting diode) has been recently used, in addition to light emitting members such as a fluorescent lamp and a xenon tube, as a luminescence portion constituting the illumination portion. For example, an image reading device is suggested in which an illumination portion is configured by arranging a plurality of light emitting devices in a main scanning direction (Japanese Unexamined Patent Application Publication No. 2002-314760).

However, in the image reading device disclosed in Japanese Unexamined Patent Application Publication No. 2002-314760, an uneven intensity distribution (uneven light intensity) may occur in a case where the illumination portion is configured by arranging the plurality of light emitting devices in the main scanning direction. This may lead to an uneven light intensity, where the intensity of light received by the CCD from portions of the same color density is not uniform. As a result, an image being read may have an uneven color density. On the other hand, in a case where the plurality of light emitting devices are tightly arranged for suppressing uneven light intensity, the cost related to the image reading device grows.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

One aspect of the invention provides an image reading device that suppresses uneven intensity of light emitted on a subject, by disposing a diffuser plate between the subject and a plurality of luminescence portions. Another aspect of the invention provides an image forming device including the abovementioned image reading device.

The image reading device may comprise: an illumination portion that irradiates light onto a subject, including a plurality of luminescence portions disposed at predetermined intervals in a main scanning direction and a diffuser plate disposed between the subject and the plurality of luminescence portions for diffusing the light emitted by the plurality of luminescence portions; at least one mirror that forms a light path by reflecting a luminous flux from the subject; an imaging lens that forms an image from the luminous flux reflected by the at least one mirror; and a reading portion that is disposed in an imaging position of the imaging lens, and reads an image on the subject on the basis of image formation by the imaging lens.

Furthermore, in the image reading device, the diffuser plate may be an elliptical diffuser plate that diffuses the light emitted by the plurality of luminescence portions with a higher diffusion rate in the main scanning direction than in a sub-scanning direction. The illumination portion may further comprise a light guiding body that is disposed between the plurality of luminescence portions and the diffuser plate. The diffuser plate may be disposed at a position where a difference of intensity in the main scanning direction in the light from the plurality of luminescence portions is small. The diffuser plate may be disposed at a position where the light from the plurality of luminescence portions is substantially uniform in the main scanning direction. Each of the plurality of luminescence portions and the diffuser plate may be attached to an attaching member that is integrally configured in a state maintaining a positional relationship where the light from the plurality of luminescence portions is substantially uniform in the main scanning direction. The attaching member may have formed therein: a mounting portion that is disposed on a side to the subject and mounts the diffuser plate; and an opening portion that is formed on the mounting portion so as to extend in the main scanning direction, and through which light incident on the diffusing plate passes.

Another aspect of the invention provides to an image forming device comprising: an image reading device having an illumination portion that irradiates light onto a subject, including a plurality of luminescence portions disposed at predetermined intervals in a main scanning direction and a diffuser plate disposed between the subject and the plurality of luminescence portions for diffusing the light emitted by the plurality of luminescence portions, at least one mirror that forms a light path by reflecting a luminous flux from the subject, an imaging lens that forms an image from the luminous flux reflected by the at least one mirror, and a reading portion that is disposed in an imaging position of the imaging lens, and reads an image on the subject on the basis of image formation by the imaging lens; an image supporting body on a surface of which an electrostatic latent image is formed on the basis of image information relating to an image of the subject that is read by the image reading device; a developing unit that develops a toner image on the electrostatic latent image formed on the image supporting body; a transfer portion that directly or indirectly transfers the toner image formed on the image supporting body to a predetermined paper; and a fixing portion that fixes the toner image transferred to the predetermined paper by the transfer portion.

In the image forming device, the diffuser plate may be an elliptical diffuser plate that diffuses the light emitted by the plurality of luminescence portions with a higher diffusion rate in the main scanning direction than in a sub-scanning direction. The illumination portion may further comprise a light guiding body that is disposed between the plurality of luminescence portions and the diffuser plate. The diffuser plate may be disposed at a position where a difference of intensity in the main scanning direction in the light from the plurality of luminescence portions is small. The diffuser plate may be disposed at a position where the light from the plurality of luminescence portions is substantially uniform in the main scanning direction. Each of the plurality of luminescence portions and the diffuser plate may be attached to an attaching member that is integrally configured in a state maintaining a positional relationship where the light from the plurality of luminescence portions is substantially uniform in the main scanning direction. The attaching member may have formed therein: a mounting portion that is disposed on a side to the subject, and mounts the diffuser plate; and an opening portion that is formed on the mounting portion so as to extend in the main scanning direction, and through which light incident to the diffusing plate passes.

BRIEF DESCRIPTION OF THE DRAWINGS

The present disclosure will be described more fully hereinafter with reference to the accompanying drawings, in which embodiments of the disclosure are shown. In the Figures.

DETAILED DESCRIPTION OF THE DISCLOSURE

Figure 1:
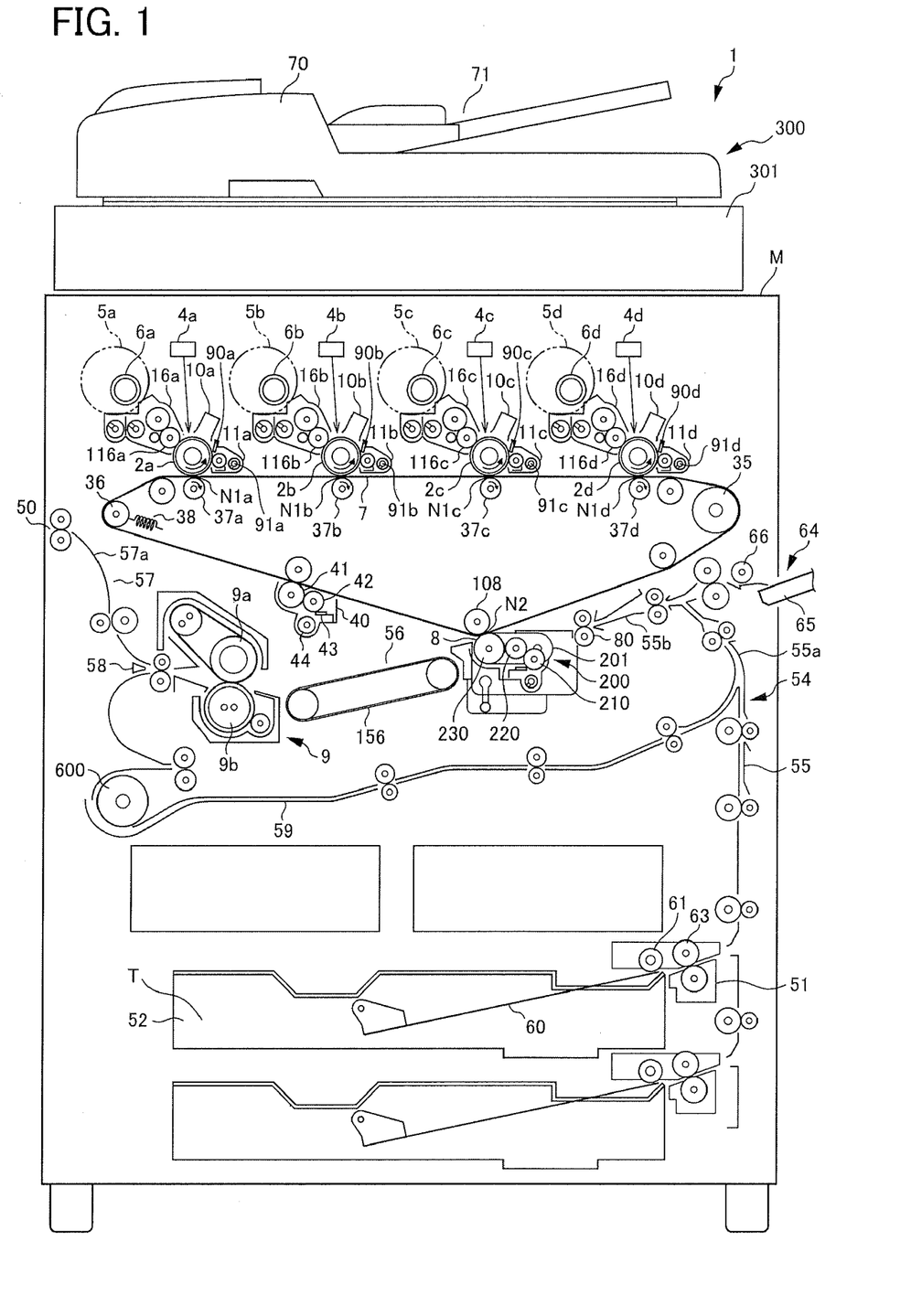
FIG. 1 is a diagram showing an arrangement of components of a color copy machine.

Some embodiments of the present disclosure are described hereinafter with reference to the drawings. An overall structure of a color copy machine 1 as an image forming device according to an illustrated embodiment is shown in FIG. 1. FIG. 1 is a left lateral view showing disposition of components of the color copy machine 1. In the illustrated embodiment, a side on which a manual feeding tray 65 (described later) is disposed (a right side in FIG. 1) is a front side of the color copy machine 1.

The color copy machine 1 as the image forming device includes: an image reading device 300 disposed on an upper side thereof, and a device main body M disposed on a lower side thereof that forms a toner image on a paper T on the basis of image information from the image reading device 300.

The image reading device 300 includes a subject feeder portion 70 for feeding a predetermined subject G (see FIG. 2), and a reader portion 301 for reading an image on the subject G. The subject feeder portion 70 is connected with the reader portion 301 by means of a connecting portion (not shown) so as to be openable and closable. The subject feeder portion 70 also protects a reading surface 302A (see FIG. 3).

In a case where the subject feeder portion 70 is closed, the subject G is placed on a subject support portion 71 provided on an upper face of the subject feeder portion 70. The subject G placed on the subject support portion 71 is fed by a feeding roller (not shown) to a first reading surface 303A (see FIG. 3) constituting the reading surface 302A in the reader portion 301. In this case, an illumination unit 347 and a mirror unit 349 (see FIG. 3), described later, are fixed to a first position 303 (see FIG. 3). Then, the subject G is slided through the first reading surface 303A and a CCD 358 (see FIG. 3), as an image reader portion, reads an image on a surface of the subject G. When the subject G is placed on a second reading surface 304A (see FIG. 3) constituting the reading surface 302A. In this case, the illumination unit 347 and the mirror unit 349 are placed in a second position 304 (see FIG. 3) and moved in a sub-scanning direction X within the second position 304. The illumination unit 347 and the mirror unit 349 are moved while maintaining a constant length of a light path H described later (see FIG. 3) (light path length). The image reading device 200 thus reads an image on the subject G placed on the second reading surface 204A. The reader portion 301 of the image reading device 300 is described later in detail.

The device main body M includes: photoreceptor drums 2a, 2b, 2c, and 2d as image supporting bodies; charging portions 10a, 10b, 10c, and 10d; laser scanner units 4a, 4b, 4c, and 4d; developing units 16a, 16b, 16c, and 16d; toner cartridges 5a, 5b, 5c, and 5d; toner feeding devices 6a, 6b, 6c, and 6d; an intermediate transfer belt 7; primary transfer rollers 37a, 37b, 37c, and 37d; an intermediate transfer unit 200 including a secondary transfer roller 8; and a fixing device 9. The device main body M further includes a paper feeding cassette 52 disposed to be slidable on a lower side of the device main body M, in which the paper T is housed in a state of being stacked. In addition, the device main body M includes a paper path 54 on which the paper T dispatched from the paper feeding cassette 52 is conveyed.

The photoreceptor drums 2a, 2b, 2c, and 2d are cylindrically shaped members. The photoreceptor drums 2a, 2b, 2c, and 2d are disposed in a rotatable manner on an axis that is vertical with respect to a paper surface of FIG. 1. An electrostatic latent image is formed on a surface of each of the photoreceptor drums 2a, 2b, 2c, and 2d.

The charging portions 10a, 10b, 10c, and 10d are disposed vertically above the photoreceptor drums 2a, 2b, 2c, and 2d. The charging portions 10a, 10b, 10c, and 10d uniformly positively charge (straight polarity) the surface of the photoreceptor drums 2a, 2b, 2c, and 2d, respectively.

The laser scanner units 4a, 4b, 4c, and 4d are disposed vertically above the photoreceptor drums 2a, 2b, 2c, and 2d respectively, spaced apart therefrom. The laser scanner units 4a, 4b, 4c, and 4d are configured each including a laser light source, a polygon mirror, a polygon mirror driving motor and the like, which are not shown.

The laser scanner units 4a, 4b, 4c, and 4d scan and expose the surface of the photoreceptor drums 2a, 2b, 2c, and 2d respectively, based on image information read by the reader portion 301. By being scanned and exposed by the laser scanner units 4a, 4b, 4c, and 4d, an electric charge charged onto the surface of the photoreceptor drums 2a, 2b, 2c, and 2d is removed respectively. In this way, an electrostatic latent image is formed on a surface of each of the photoreceptor drums 2a, 2b, 2c, and 2d.

The developing units 16a, 16b, 16c, and 16d are disposed beside the photoreceptor drums 2a, 2b, 2c, and 2d (on the left side of FIG. 1). The developing units 16a, 16b, 16c, and 16d each develop a toner image of each color on the electrostatic latent image formed on the photoreceptor drums 2a, 2b, 2c, and 2d. The developing units 16a, 16b, 16c, and 16d correspond to the four toner colors of yellow, cyan, magenta, and black. The developing units 16a, 16b, 16c, and 16d are configured to include developing rollers 116a, 116b, 116c, and 116d that can be disposed facing the photoreceptor drums 2a, 2b, 2c, and 2d, and stirring rollers for stirring toners, respectively.

The toner cartridges 5a, 5b, 5c, and 5d store toners of the colors that are supplied to the developing units 16a, 16b, 16c, and 16d, respectively. The toner cartridges 5a, 5b, 5c, and 5d store toners of yellow, cyan, magenta, and black respectively.

The toner feeding devices 6a, 6b, 6c, and 6d supply the toners of the colors stored in the toner cartridges 5a, 5b, 5c, and 5d to the developing units 16a, 16b, 16c, and 16d, respectively.

Toner images of respective colors developed on the photoreceptor drums 2a, 2b, 2c, and 2d are sequentially transferred to the intermediate transfer belt 7. The intermediate transfer belt 7 is disposed to be stretched around a driving roller 35 and a tension roller 36. Since the tension roller 36 is spring biased away from the driving roller 35 by a spring 38, a predetermined tension is applied to the intermediate transfer belt 7.

The primary transfer rollers 37a, 37b, 37c, and 37d are disposed across the intermediate transfer belt 7 from the photoreceptor drums 2a, 2b, 2c, and 2d.

Predetermined portions of the intermediate transfer belt 7 are sandwiched between the primary transfer rollers 37a, 37b, 37c, and 37d and the photoreceptor drums 2a, 2b, 2c, and 2d. The predetermined portions being sandwiched are pressed against surfaces of the photoreceptor drums 2a, 2b, 2c, and 2d. Primary transfer nips N1a, N1b, N1c, and N1d are thus formed. Then, the toner images of the colors developed on the photoreceptor drums 2a, 2b, 2c, and 2d are sequentially transferred to the intermediate transfer belt 7. A full-color toner image is thus formed on the intermediate transfer belt 7.

A primary transfer bias, for transferring the toner images of the colors developed on the photoreceptor drums 2a, 2b, 2c, and 2d to the intermediate transfer belt 7 respectively, is applied to each of the primary transfer rollers 37a, 37b, 37c, and 37d by a voltage application portion (not shown).

The secondary transfer roller 8 secondarily transfers the toner image, primarily transferred to the intermediate transfer belt 7, to the paper T. A secondary transfer bias for transferring the toner image on the intermediate transfer belt 7 to the paper T is applied to the secondary transfer roller 8, by a voltage application portion (not shown).

The secondary transfer roller 8 can be either in contact with or spaced apart from the intermediate transfer belt 7. More specifically, the secondary transfer roller 8 is configured to be movable between a contacting position that is in contact with the intermediate transfer belt 7 and a spaced position that is spaced apart from the intermediate transfer belt 7. In particular, the secondary transfer roller 8 is moved to the contacting position for transferring the toner image primarily transferred to a surface of the intermediate transfer belt 7 to the paper T, and to the spaced position in all other circumstances. Here, the secondary transfer roller 8 is moved to and away from the intermediate transfer belt 7 by rotational movement of the entire intermediate transfer unit 200.

The secondary transfer roller 8 is included in the intermediate transfer unit 200. The intermediate transfer unit 200 includes: a housing 201 that stores and pivotally supports the secondary transfer roller 8; a rotation driving gear 210 disposed on a lateral face of the housing 201; a roller-side gear 230 disposed on the lateral face of the housing 201 in a direction of a rotational axis of the secondary transfer roller 8; and an idle gear 220 disposed to be in contact with the rotation driving gear 210 and the roller-side gear 230. The intermediate transfer unit 200 is rotationally moved on a rotational axis (not shown) by an attaching/detaching portion (not shown), between a position where the secondary transfer roller 8 can be in contact with the intermediate transfer belt 7 and a position where the secondary transfer roller 8 is not in contact with the intermediate transfer belt 7.

An opposing roller 108 is disposed across the intermediate transfer belt 7 from the secondary transfer roller 8. A predetermined portion of the intermediate transfer belt 7 is sandwiched between the secondary transfer roller 8 and the opposing roller 108. The paper T is pressed against a surface (a side to which the image is primarily transferred) of the intermediate transfer belt 7. A secondary transfer nip N2 is thus formed and the toner image primarily transferred to the intermediate transfer belt 7 is transferred to the paper T.

The fixing device 9 fuses and fixes color toners constituting the toner image secondarily transferred to the paper T. The fixing device 9 includes a heating roller 9a that is heated by a heater, and a pressurizing roller 9b that is pressurized contact with the heating roller 9a. The heating roller 9a and the pressurizing roller 9b sandwiches and conveys the paper T to which the toner image is secondarily transferred. The paper T is conveyed in a state of being sandwiched between the heating roller 9a and the pressurizing roller 9b, thereby fusing and fixing the toner transferred thereto.

A belt cleaning device 40 for cleaning the intermediate transfer belt 7 is disposed between the secondary transfer roller 8 and the tension roller 36. The belt cleaning device 40 includes a cleaning brush 41 that slidingly contacts the surface of the intermediate transfer belt 7; a cleaning roller 42 disposed so as to contact the cleaning brush 41; a blade 43 disposed so that a tip thereof contacts a surface of the cleaning roller 42; and a collection spiral 44 disposed below the blade 43.

The paper feeding cassette 52 for housing the paper T is disposed to be horizontally slidable on a lower side of the device main body M in a vertical direction. The paper feeding cassette 52 stores the paper T in a state of being stacked. The paper feeding cassette 52 includes a paper tray 60 on which the paper T is placed. The paper T arranged on the paper tray is dispatched to the paper path 54 by a cassette feeding portion 51 disposed in an end portion of the paper feeding cassette 52 on a side of dispatching the paper (in a right end portion of FIG. 1). The cassette feeding portion 51 includes a double feed preventing mechanism composed of: a forward feed roller 61 for picking up the paper T on the paper tray 60; and a roller pair 63 for feeding the paper T one sheet at a time to the paper path 54.

The paper path 54 for conveying the paper T is formed between the cassette feeding portion 51 and an ejection portion 50. The paper path 54 includes: a first paper path 55 from the cassette feeding portion 51 to the secondary transfer roller 8; a second paper path 56 from the secondary transfer roller 8 to the fixing device 9; and a third paper path 57 from the fixing device 9 to the ejection portion 50. A diverter arm 58 is provided at an exit of the fixing device 9. A reverse paper path 59 for returning the paper T to the first paper path 55 is provided between the diverter arm 58 and a curved path 55a (described later) in the first paper path 55.

The first paper path 55 includes the curved path 55a for conveying the paper T, dispatched from the paper feeding cassette 52, vertically upward and changing a conveying direction thereof to leftward in FIG. 1, and a straight path 55*b* from the curved path 55*a* to the secondary transfer roller 8. A guide plate and a pair of rollers for guiding and conveying the paper T are disposed in the first paper path 55. In addition, a sensor for detecting the paper T and a resist roller pair 80 for skew compensation of the paper T and timing adjustment with respect to the toner image are disposed in the first paper path 55. The sensor is disposed immediately before the resist roller pair 80 in a conveying direction of the paper T (on an upstream side thereof in the conveying direction). The resist roller pair 80 conveys the paper T while performing the abovementioned compensation and the timing adjustment based on detection information from the sensor.

The second paper path 56 is a straight paper path that is declivitous toward the fixing device 9. A conveyor belt 156 for conveying the paper T placed thereon is disposed in the second paper path 56. In addition, a sensor for detecting the paper T is disposed in a predetermined position on the second paper path 56.

The third paper path 57 is formed to be acclivitous from the exit of the fixing device 9 toward an upper left portion in FIG. 1. The third paper path 57 is configured to include a vertical paper path 57*a* that is provided on a downstream side of the diverter arm 58 in the conveying direction and formed to be acclivitous. The paper T conveyed on the third paper path 57 passes above the diverter arm 58, and is then conveyed substantially vertically upward. Subsequently, the paper T is ejected from the ejecting portion 50 to the outside of the device main body M. The third paper path 57 is configured to include a guide plate and a pair of rollers for guiding and conveying the paper T, as with other paper paths.

The reverse paper path 59 is formed to branch downward from the diverter arm 58 to an opposite direction to the third paper path 57, pass vertically below the fixing device 9, the second paper path 56, the secondary transfer roller 8 and the resist roller pair 80, and then go vertically upward. The reverse paper path 59 is formed to join the curved path 55*a* in the first paper path 55. The reverse paper path 59 is a paper path for returning the paper T having passed through the fixing device 9 to an upstream side of the resist roller pair 80 that is disposed on an upstream side of the secondary transfer roller 8. The reverse paper path 59 is a paper path used for duplex printing, in which toner images (including letters and the like) are printed on both sides of the paper T. The paper T is, for example, returned to the first paper path 55 via the reverse paper path 59, in a state of being reversed by a reversing roller 600. The reverse paper path 59 is, as with other paper paths, configured to include a guide plate and a pair of rollers for guiding and conveying the paper T, and includes a sensor for detecting paper in a predetermined position.

The manual feeding portion 64 is provided on the right side of the device main body M in FIG. 1, above the feeding cassette 52. The manual feeding portion 64 includes the manual feeding tray 65, which constitutes a side wall in a closed state, and a feeding roller 66. The manual feeding tray 65 is connected by a lower end thereof so as to be rotatable (openable and closable), in the vicinity of the curved path 55*a* of the first paper path 55. The manual feeding portion 64 feeds the paper T placed on the manual feeding tray 65 in an open state to the curved path 55*a* of the first paper path 55.

Figure 2:
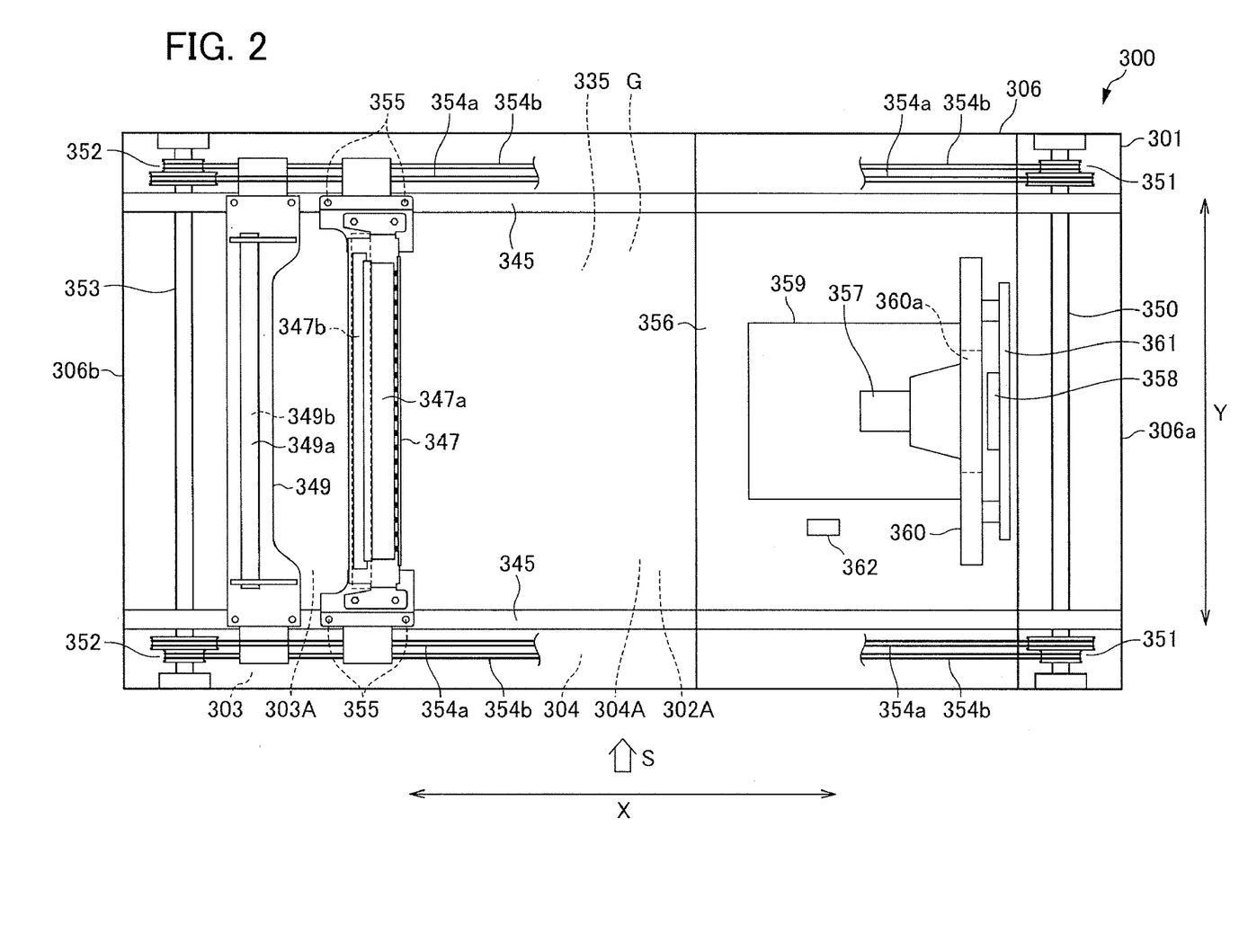
FIG. 2 is a schematic plan view of an internal configuration of a reader portion.
Figure 3:
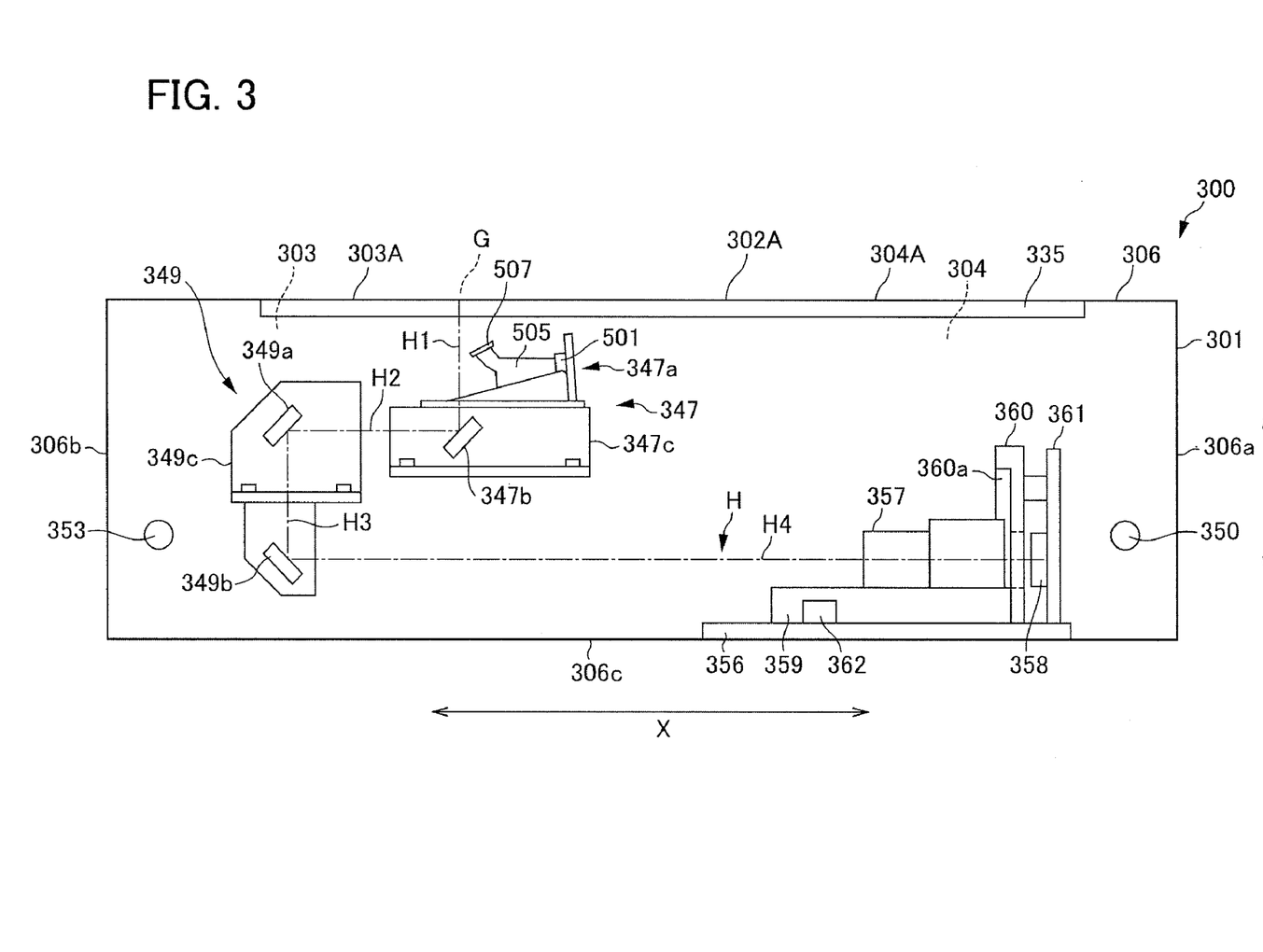
FIG. 3 is a diagram of FIG. 2 viewed from a direction of an arrow S, noting that FIG. 3 is a schematic view, accordingly omitting members shown in FIG. 2 for illustrative purposes.
Figure 4:
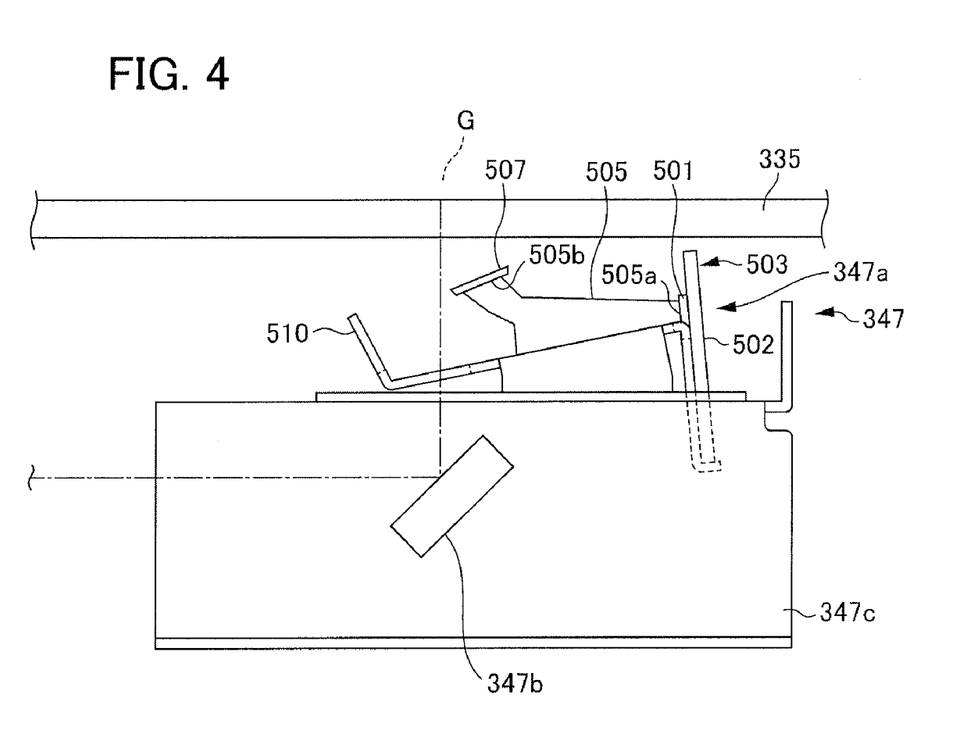
FIG. 4 is a cross-sectional view showing a configuration of an illumination portion.
Figure 5:
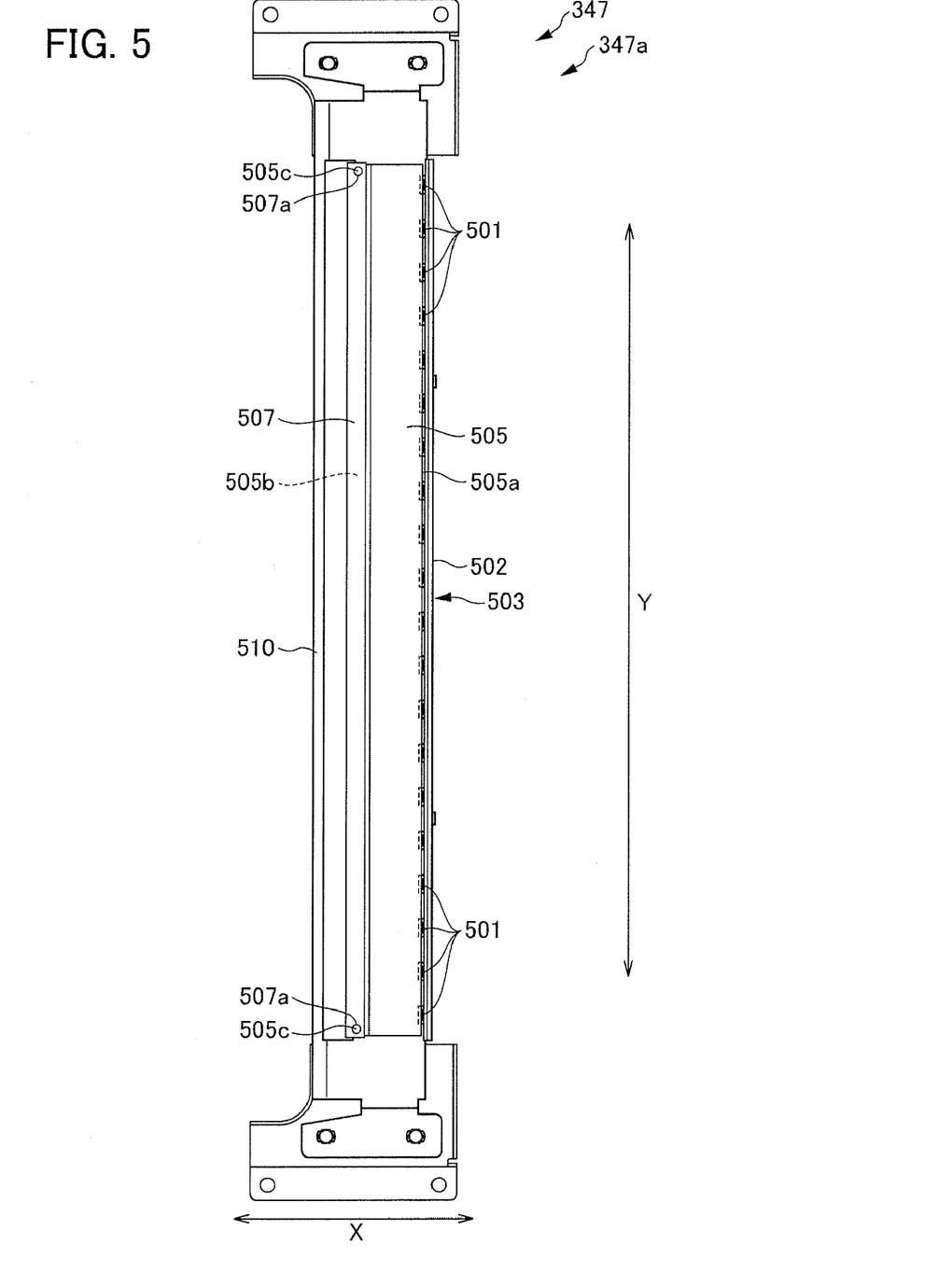
FIG. 5 is a plan view showing a configuration of the illumination portion.
Figure 6A:
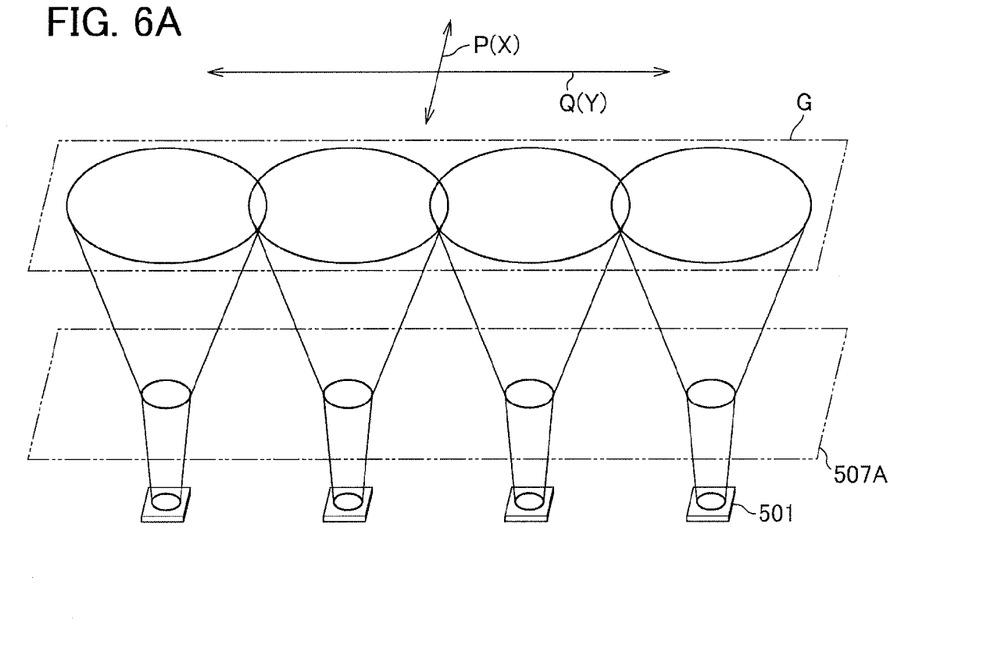
FIG. 6A is a schematic view showing the diffusion of light in a case where a conventional diffuser plate is used.
Figure 6B:
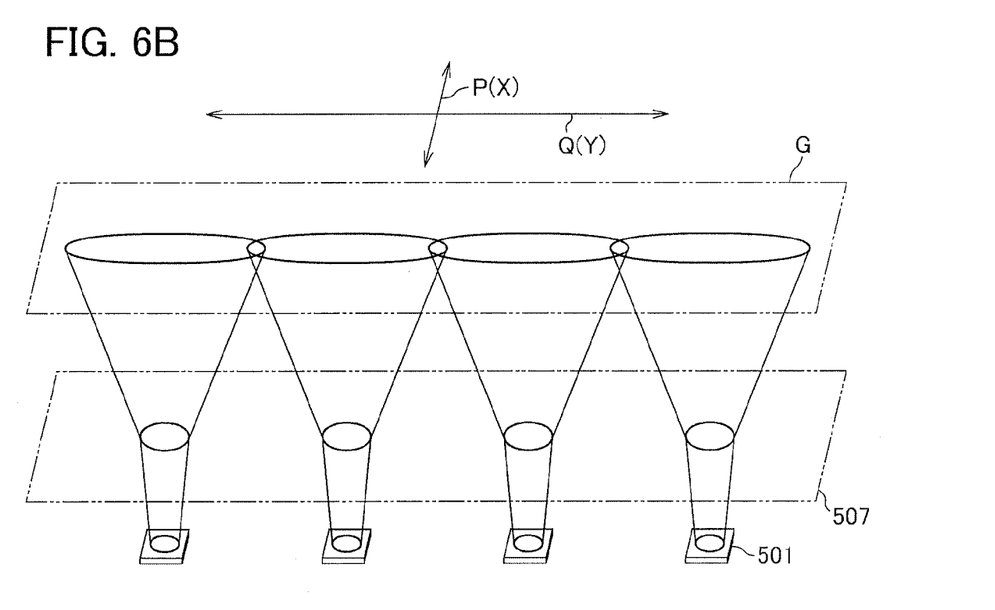
FIG. 6B is a schematic view showing the diffusion of light in a case where an elliptical diffuser plate is used.
Figure 7A:
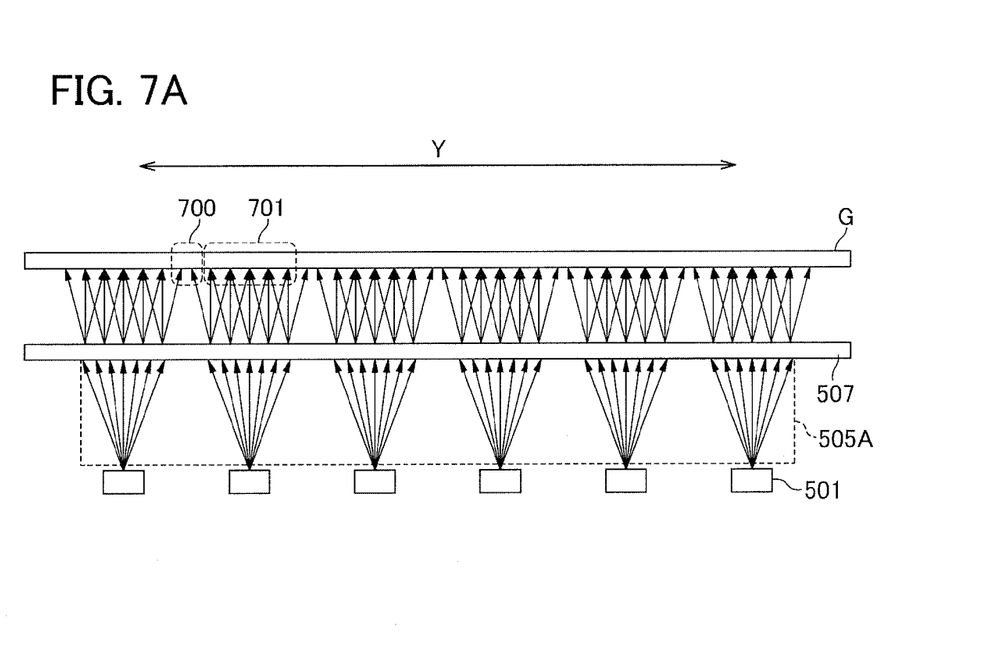
FIG. 7A is a diagram showing an example of an arrangement of the elliptical diffuser plate.
Figure 7B:
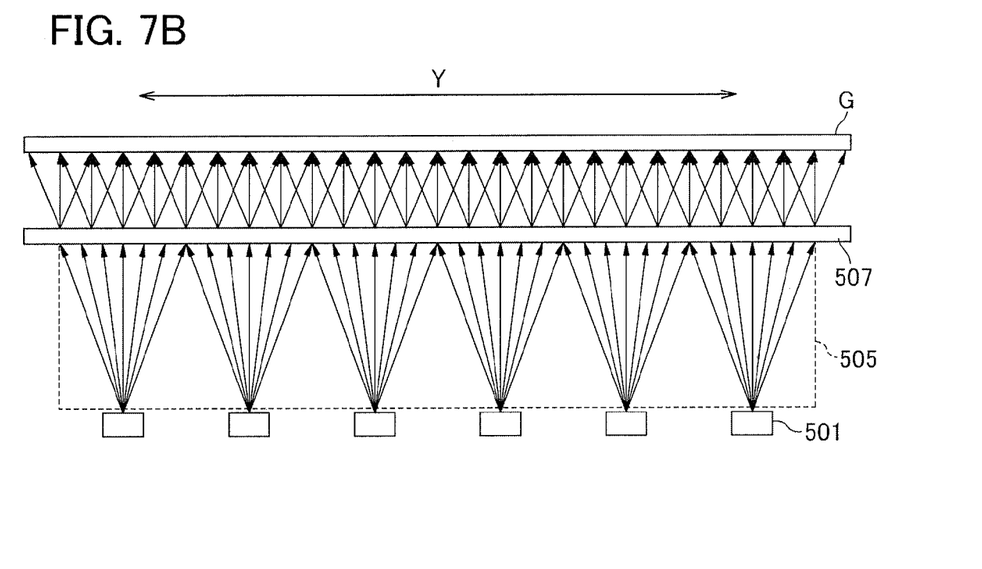
FIG. 7B is a diagram showing another example of an arrangement of the elliptical diffuser plate.

The reader portion 301 constituting the image reading device 300 is described hereinafter with reference to FIGS. 2 to 7B. FIG. 2 is a schematic plan view of an internal configuration of the reader portion 301. FIG. 3 is a diagram of FIG. 2 viewed from a direction of an arrow S. It should be noted that FIG. 3 is a schematic view, accordingly omitting members shown in FIG. 2 for illustrative purposes. FIG. 4 is a cross-sectional view showing a configuration of the illumination portion 347*a*. FIG. 5 is a plan view showing a configuration of the illumination portion 347*a*. FIG. 6A is a schematic view showing the diffusion of light in a case where a conventional diffuser plate 507A is used. FIG. 6B is a schematic view showing the diffusion of light in a case where an elliptical diffuser plate 507 is used. FIG. 7A is a diagram showing an example of an arrangement of the elliptical diffuser plate 507. FIG. 7B is a diagram showing another example of an arrangement of the elliptical diffuser plate 507.

In the illustrated embodiment as shown in FIGS. 2 and 3, the reader portion 301 includes: a contact glass 335 on which the subject G is placed; a pair of guide rails 345; a drive shaft 350 to which drive pulleys 351 are attached; a spindle 353 to which driven pulleys 352 are attached; an illumination unit 347 as the illumination portion; a mirror unit 349; an imaging lens 357; a CCD 358 as the reader portion; and an optical sensor 362.

In the illustrated embodiment as shown in FIG. 2, the reader portion 301 includes the contact glass 335 disposed on an upper face (on a front side of FIG. 2), on which the subject G is placed. The contact glass 335 is disposed substantially in parallel to a horizontal plane in a case where the color copy machine 1 is disposed in a normal state.

The pair of guide rails 345 is disposed between lateral faces 306*a* and 306*b* (on the left and the right in FIG. 2) of the reader portion 301. The pair of guide rails 345 is disposed in parallel with the abovementioned contact glass 335 (see FIG. 3). The illumination unit 347 and the mirror unit 349 are movably disposed on the pair of guide rails 345. The drive shaft 350 is disposed on a side to the lateral face 306*a*, so as to be orthogonal to the pair of guide rails 345. The drive shaft 350 is driven for normal and reverse rotation by a driving motor (not shown). The drive pulleys 351 each having a major diameter portion and a minor diameter portion are attached at both ends of the drive shaft 350, which is disposed more outward in the main scanning direction Y than the guide rails 345.

The spindle 353 is disposed on a side to the lateral face 306*b*, so as to be orthogonal to the pair of guide rails 345. The driven pulleys 352 having the same diameter as the drive pulleys 351 are attached at both ends of the spindle 353, which is disposed more outward in the main scanning direction Y than the guide rails 345.

A driving wire 354*a* with a loop shape is wound on the major diameter portions of the drive pulley 351 and the driven pulley 352. Then, the illumination unit 347 is fixed to the driving wire 354*a*.

In addition, circular driving wires 354*b* is wound on the minor diameter portions of the drive pulleys 351 and the driven pulleys 352. Additionally, the mirror unit 349 is fixed to the driving wire 354*b*.

The circular driving wires 354*a* and 354*b* are rotated (in a direction of a loop) in accordance with rotation of the drive shaft 350 by the driving motor. As a result, the illumination unit 347 and the mirror unit 349 are moved in the sub-scanning direction X (in a horizontal direction of the drawing) along the pair of guide rails 345, in accordance with rotation of the circular driving wires 354*a* and 354*b*. Since a ratio of diameters between the major diameter portion and the minor diameter portion, in the drive pulley 351 and the driven pulley 352, is 2:1, a ratio of travel distance between the illumination unit 347 and the mirror unit 349 is also 2:1.

Here, two contacts 355 are provided on each portion of the illumination unit 347 and the mirror unit 349 contacting upper faces of the guide rails 345. The contacting surface of each of the contacts 355 with the guide rails 345 is made to be spherical. This allows for smooth movement of the illumination unit 347 and the mirror unit 349 in the sub-scanning direction X.

An ISU base 356 as a supporting member is attached to a bottom face of the reader portion 301 on a side to the lateral face 306a. The imaging lens 357 and the CCD 358 as the reader portion are attached to an upper face of the ISU base 356 in a predetermined positional relationship.

The imaging lens 357 is mounted on a lens supporting mount 359 that is fixed on the ISU base 356. The lens supporting mounting 359 is disposed so that a position thereof can be adjusted by a guiding member 360 disposed on a side to the CCD 358. The imaging lens 357 is disposed substantially in a center of the reader portion 301 in the sub-scanning direction X. The imaging lens 357 is disposed on a side to an end portion that is opposite to a side to the subject G on the light path H. The imaging lens 357 forms an image in a predetermined position from the luminous flux H4 (see FIG. 3) incident thereon. In other words, the imaging lens 357 forms an image of the subject G in the predetermined position.

The CCD 358 is mounted on a CCD substrate 361 disposed on a back surface of the guiding member 360. The CCD 358 is disposed in an imaging position of the imaging lens 357. Luminous flux from the imaging lens 357 is incident on the CCD 358 via an open window 360a formed in the vicinity of a center of the guiding member 360. A light axis of the luminous flux incident upon the CCD 358 is compensated by fine-tuning the position of the guiding member 360.

The optical sensor 362 is disposed on the ISU base 356. The optical sensor 362 determines the size of the subject G (in a horizontal direction in FIG. 2) based on whether a reflected light is received from the subject G placed on the contact glass 335.

IN the illustrated embodiment as shown in FIG. 3, the illumination unit 347 includes: an illumination portion 347a as the illumination portion; a first mirror 347b; and a first frame body 347c for housing the illumination portion 347a and the first mirror 347b.

The illumination portion 347a includes: a plurality of LEDs 501 as the plurality of luminescence portions; a light guiding body 505 disposed in the vicinity of or in contact with the plurality of LEDs 501; an elliptical diffuser plate 507 as the diffuser plate disposed in the light guiding body 505 on a side to the contact glass 335. The illumination portion 347a is described later in detail.

The first mirror 347b is disposed on a lower side of the illumination unit 347 in a thickness direction Z. The first mirror 347b is disposed so as to direct a reflective surface thereof toward the subject G and the second mirror 349a. The first mirror 347b reflects the luminous flux H1 from the subject G to direct the luminous flux H1 toward the second mirror 349a.

The first frame body 347c houses the illumination portion 347a and the first mirror 347b. The first frame body 347c is fixed to the driving wire 354a wound on the major diameter portions of the drive pulley 351 and the driven pulley 352. The first frame body 347c is moved in the sub-scanning direction X along the pair of guide rails 345, in accordance with rotation of the driving wires 354a and 354b.

The mirror unit 349 includes: a second mirror 349a; a third mirror 349b; and a second frame body 349c for housing the second mirror 349a and the third mirror 349b.

The second mirror 349a is disposed on an upper side of the second frame body 349c in a thickness direction Z. The second mirror 349a is disposed so as to direct a reflective surface thereof toward the first mirror 347b and the third mirror 349b. The second mirror 349a reflects a luminous flux H2 from the first mirror 347b to direct the luminous flux H2 toward the third mirror 349b.

The third mirror 349b is disposed on a lower side of the second frame body 349c in a thickness direction Z. The third mirror 349b is disposed so as to direct a reflective surface thereof toward the second mirror 349a and the imaging lens 357. The third mirror 349b reflects a luminous flux H3 from the second mirror 349a to direct the luminous flux H3 toward the imaging lens 357.

The first mirror 347b, the second mirror 349a, and the third mirror 349b form a light path H so that the light from the subject G is incident on the imaging lens 357. As described above, since the illumination unit 347 moves in the sub-scanning direction X at a speed A while the mirror unit 349 moves in the sub-scanning direction X at a speed A/2, the length of the light path H is kept constant even while reading an image.

Some embodiments of the illumination portion 347a are described in detail with reference to FIGS. 4 to 7B. In the illustrated embodiment as shown in FIG. 4, the illumination portion 347a includes: an LED unit 503 to which a plurality of LEDs 501 is attached; the light guiding body 505; the elliptical diffuser plate 507; and an attaching member 510 to which the LED unit 503, the light guiding member 505, and the elliptical diffuser plate 507 are attached.

The LED unit 503 includes the plurality of LEDs 501 and a metallic plate-like member 502 of high rigidity to which the plurality of LEDs 501 is attached.

In the illustrated embodiment as shown in FIG. 5, the plurality of LEDs 501 is respectively attached to the plate-like member 502 with spaces therebetween. The plurality of LEDs 501 is respectively arranged in the main scanning direction Y at regular intervals. The plurality of LEDs 501 is respectively attached to the metallic attaching member 510 of high rigidity via the plate-like member 502. Each of the plurality of LEDs emits light for irradiating the subject G. Here, the number of and interval between the plurality of LEDs 501 are configured in accordance with the function and positional relationship of the light guiding body 505 and the elliptical diffuser plate 507 (described later).

In the illustrated embodiment as shown in FIG. 4, the light guiding body 505 is disposed so that a first end 505a faces the plurality of LEDs 501 and a second end 505b faces the contact glass 335. The light guiding body 505 guides light from each of the plurality of LEDs 501 toward the contact glass 335. The light guiding body 505 causes light incident from a first end 505a side to be emitted from a the second end 505b side. The light guiding body 505 guides light to the elliptical diffuser plate 507 while suppressing unnecessary diffusion. The shape and size of the light guiding body 505 is configured by features of the elliptical diffuser plate 507, degree of diffusion of light from the LED 501, and the like.

The elliptical diffuser plate 507 is disposed between the light guiding body 505 and the subject G. More specifically, the elliptical diffuser plate 507 is attached to the second end 505b of the light guiding body 505. In particular, the elliptical diffuser plate 507 is attached in a state of being placed on the second end 505b of the light guiding body 505. The elliptical diffuser plate 507 is attached to the second end 505b of the light guiding body 505 by, for example, an adhesive or adhesion tape. The elliptical diffuser plate 507 can be positioned and fixed by inserting positioning portions 505c and 505c (see FIG. 5) formed on the light guiding body 505 into hole portions 507a and 507a (see FIG. 5) formed on the elliptical diffuser plate 507.

The elliptical diffuser plate 507 is a diffuser plate configured so that a diffusion rate in a predetermined direction and a diffusion rate in another direction that is orthogonal thereto are different. Hereinafter, the elliptical diffuser plate 507 is described by comparison with a conventional diffuser plate 507A.

In the illustrated embodiment as shown in FIG. 6, the conventional diffuser plate 507A uniformly diffuses light from the LED 501. In other words, the conventional diffuser plate 507A has a function of further diffusing light from the LED 501 from a natural state thereof.

The elliptical diffuser plate 507 is a diffuser plate configured so that a diffusion rate of the light from the LED 501 in a predetermined direction P and a diffusion rate thereof in another direction Q that is orthogonal thereto are different. More specifically, the elliptical diffuser plate 507 diffuses the light from the LED 501 at a low diffusion rate in the predetermined direction P and at a high diffusion rate in another direction Q. The elliptical diffuser plate 507 does not substantially diffuse the light from the LED 501 in the predetermined direction P, and diffuses the light from the LED 501 at a high diffusion rate in another direction Q. In this case, the intensity (volume) of light irradiated onto the subject G is greater than in a case where the diffuser plate 507A shown in FIG. 6 is used.

The elliptical diffuser plate 507 is disposed so that the predetermined direction is along the sub-scanning direction X, and the other direction is along the main scanning direction Y. In other words, the elliptical diffuser plate 507 diffuses the light at a low diffusion rate in the sub-scanning direction X and at a high diffusion rate in the main scanning direction Y.

The elliptical diffuser plate 507 is disposed at a position with a small difference in light intensity in the main scanning direction Y. Preferably, the elliptical diffuser plate 507 is disposed at a position substantially without difference in light intensity in the main scanning direction Y. Hereinafter, a reason for disposing the elliptical diffuser plate 507 at a position with a small difference in light intensity in the main scanning direction Y is explained.

In the illustrated embodiment as shown in FIG. 7A, in a case where the elliptical diffuser plate 507 is disposed in a position where the light from the LEDs 501 is not sufficiently diffused (a position with a difference in light intensity), the light diffused and irradiated onto the subject G by the elliptical diffuser plate 507 includes a part of lower light intensity 700 and a part of higher light intensity 701. In other words, the intensity of the light irradiated onto the subject G is uneven in the main scanning direction Y.

Here, in a case where a gloss black colored subject G curled vertically upward (upward in FIG. 7A) is irradiated with light, specularly reflected light from the subject G is incident on the CCD 358. In this case, since the intensity of the light irradiated onto the subject G is uneven, the same number of point-like flare images as the LEDs 501 is formed on an image being read.

In the illustrated embodiment as shown in FIG. 7B, in a case where the elliptical diffuser plate 507 is disposed at a position where the light from the LEDs 501 is sufficiently diffused (a position with small difference in light intensity), the light diffused and irradiated onto the subject G by the elliptical diffuser plate 507 is diffused so that a difference in light intensity is small. In other words, the light irradiated onto the subject G is made to be substantially uniform. In this case, even in a case where the gloss black colored subject G curled vertically upward is irradiated with light and the specularly reflected light therefrom is incident on the CCD 358, point-like flare images are not formed on the image being read.

For the reason described above, the elliptical diffuser plate 507 is disposed at a position with a small difference in light intensity in the main scanning direction Y, and preferably at a position substantially without difference in light intensity in the main scanning direction Y.

Some embodiments of the abovementioned light guiding body 505 (see FIG. 4) are configured to have a length (in a direction of light travel) with which the difference in intensity of the light incident upon the elliptical diffuser plate 507 is small.

In the illustrated embodiment as shown in FIG. 4, the attaching member 510 is disposed on a vertically upper side (upper side in FIG. 4) in the first frame body 347c. The LED unit 503 and the light guiding body 505 are attached to the attaching member 510. The plurality of LEDs 501 is attached to the attaching member 510 via the LED unit 503. The elliptical diffuser plate 507 is attached to the attaching member 510 via the light guiding body 505. In other words, the attaching member 510 maintains a positional relationship between the plurality of LEDs 501 and the elliptical diffuser plate 507.

Some embodiments of operations in the image reading device 300 are described hereinafter. First, the subject feeder portion 70 is made to be in an open state and the subject G is placed on a second reading surface 304A (see FIG. 3) constituting the reading surface 302A. The illumination unit 347 and the mirror unit 349 are brought to the second position 304 as the optical sensor 362 (see FIG. 3) detects that the subject G is placed on the second reading surface 304A.

Subsequently, the subject feeder portion 70 is made to be in a closed state. When a start switch (not shown) is pressed, the color copy machine 1 is instructed to copy an image on the subject G. When a start switch (not shown) is pressed, the image reading device 300 starts an operation of reading the image on the subject G.

More specifically, first, the plurality of LEDs 501 (see FIG. 3) is turned on. Light from the plurality of LEDs 501 thus turned on is incident upon the elliptical diffuser plate 507 (see FIG. 3) via the light guiding body 505. The light incident upon the elliptical diffuser plate 507 is diffused in the main scanning direction Y and irradiated on the subject G without substantially being diffused in the sub-scanning direction X. The subject G is irradiated with line-like light that extends in the main scanning direction Y.

As described above, the light irradiated onto the subject G is adjusted to have a uniform intensity in the main scanning direction Y. In addition, since the light irradiated onto the subject G is substantially not diffused in the sub-scanning direction X, the intensity of the light per unit area is greater than in a case where a conventional diffuser plate is used or where a diffuser plate is not used.

The illumination unit 347 and the mirror unit 349 are moved in the sub-scanning direction X while irradiating light onto the subject G. The illumination unit 347 and the mirror unit 349 are moved while maintaining a length of the light path H constant.

A luminous flux from the subject G is incident upon the imaging lens 357 after being reflected by the first mirror 347b, the second mirror 349a, and the third mirror 349b (see FIG. 3). The imaging lens 357 forms an image of the subject G. The CCD 358 disposed in the imaging position reads the image of the subject G as image data, based on the image formed on the CCD 358 via the open window 360a of the guiding member 360 (see FIG. 3).

Here, since the light from the elliptical diffuser plate 507 is adjusted to have a uniform intensity in the main scanning direction Y, for example, even in a case where the specularly reflected light from the gloss black colored curled subject G is incident on the CCD 358, the point-like flare images are not formed on the image being read.

In addition, since the light from the elliptical diffuser plate 507 is adjusted to have a uniform intensity in the main scanning direction Y, the image on the subject G is read appropriately.

The image information read by the CCD 358 is output to the CCD substrate 361. The image information being output to the CCD substrate 361 is then output to the device main body M via a predetermined circuit substrate.

The image information being input is input to an image forming control unit (not shown) in the device main body M. The image forming control unit controls the photoreceptor drum 2 as the image supporting body, the charging portion 10, the laser scanner unit 4, the developing unit 16 and the like constituting the image forming portion, based on the image information. A predetermined toner image is formed on the photoreceptor drum 2 based on the image information (see FIG. 1).

An image similar to the image of the subject G is transferred to the paper T, which is conveyed to the transfer nip N formed by the photoreceptor drum 2, based on the image information. The paper T, on which the image is formed, is ejected from the ejecting portion 50 to the outside of the device main body M (see FIG. 1).

According to some embodiments, an image reading device 300 can be provided that suppresses uneven intensity of light emitted on the subject G, by disposing the elliptical diffuser plate 507 between the subject G and the plurality of LEDs 501. In addition, in this way, uneven color density and the generation of point-like flare images on the image being read can be suppressed.

The elliptical diffuser plate 507 diffuses the light at a high diffusion rate in the main scanning direction Y and irradiates the subject G therewith. This can reduce the number of LEDs 501 that are arranged in the main scanning direction Y. Therefore, material cost for the color copy machine 1 can be reduced.

Since the elliptical diffuser plate 507 with a low diffusion rate in the sub-scanning direction X is used, the intensity of the light per unit area can be made greater. Therefore, the image on the subject G is appropriately read and the number of LEDs 501 can be reduced.

Since the elliptical diffuser plate 507 is disposed at a position where there is no unevenness in intensity of light incident thereupon, the light irradiated onto the subject G can be made uniform.

Furthermore, the light from the plurality of LEDs 501 is guided to the elliptical diffuser plate 507 while suppressing unnecessary diffusion, by means of the light guiding body 505. Therefore, the light from the plurality of LEDs can be incident onto the elliptical diffuser plate 507 effectively.

In addition, the elliptical diffuser plate 507 can be attached at an appropriate position by adjusting the size of the light guiding body 505. In other words, by adjusting the size of the light guiding body 505 (length thereof in a direction of light travel) so as to fully diffuse the light from the plurality of LEDs 501, the light diffused by the elliptical diffuser plate 507 and irradiated onto the subject G can be made uniform in the main scanning direction Y.

In addition, the elliptical diffuser plate 507 is attached to the second end 505b of the light guiding body 505. This allows the elliptical diffuser plate 507 to be attached readily and firmly at a position where the light irradiated onto the subject G is uniform.

Furthermore, an LED unit 503 to which the plurality of LEDs 501 is attached, and the light guiding body 505 to which the elliptical diffuser plate 507 is attached, are attached to the metallic and high-rigidity attaching member 510. This maintains a positional relationship between the plurality of LEDs 501 and the elliptical diffuser plate 507. Light can thus be stably irradiated onto the subject G without unevenness in the main scanning direction Y.

Moreover, a color copy machine 1 including an image reading device providing the above effects can be provided. The color copy machine 1 can also provide similar effects as in the abovementioned image reading device 300.

Some embodiments of the present disclosure has been described above; however, the present disclosure is not limited thereto and can be carried out in various modes. For example, the copy machine 1 is exemplified in the present embodiment as an image forming device; however, the present disclosure is not limited thereto and can be a black and white copy machine, a printer, a facsimile machine and a multi-functional printer having functions thereof.

In addition, the image reading device 300 is integratedly formed with the device main body M in the present embodiment; however, the present disclosure is not limited thereto and the image reading device can be configured with a housing other than the device main body M. For example, the image reading device 300 can be configured to be removable with respect to the device main body M.

Furthermore, the image reading device 300 constitutes a part of the copy machine 1 as the image forming device in the present embodiment; however, the present disclosure is not limited thereto, and the image reading device 200 can be a stand-alone device such as an image scanner.

Moreover, the LED 501 is described as the illumination portion; however, the present disclosure is not limited thereto. For example, devices using organic EL (organic electro-luminescence) and optical fiber, and various lamps can also be used as the illumination portion.

In addition, illumination portion 347a has the light guiding body 505 between the plurality of LEDs 501 and the elliptical diffuser plate 507; however, the present disclosure is not limited thereto and can be configured so that the light from the plurality of LEDs 501 is directly incident upon the elliptical diffuser plate 507.

Furthermore, an example using an elliptical diffuser plate, which is adjusted so that a diffusion rate in a predetermined direction is high, as the diffuser plate is described; however, the present disclosure is not limited thereto and a diffuser plate and the like having the same diffusion rate in all directions may also be used.

Moreover, the elliptical diffuser plate 507 is attached to the light guiding body 505; however, the present disclosure is not limited thereto and, for example, the elliptical diffuser plate 507 may be attached directly to a high-rigidity attaching member that is configured integrally.

Figure 8A:
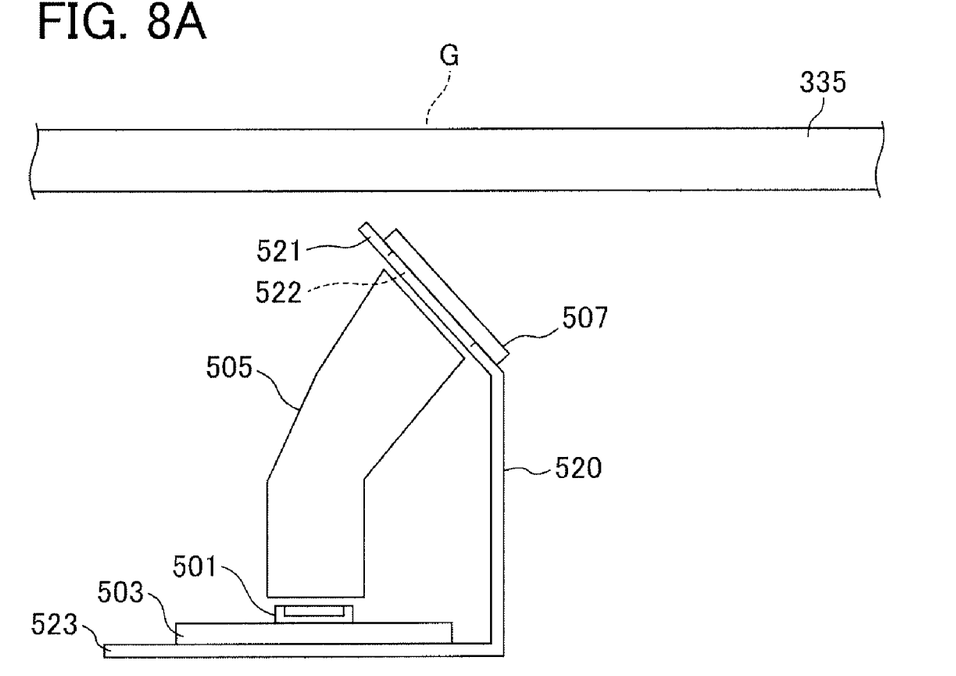
FIG. 8A is a diagram showing a state where an LED unit and the elliptical diffuser plate are attached to an attaching member.
Figure 8B:
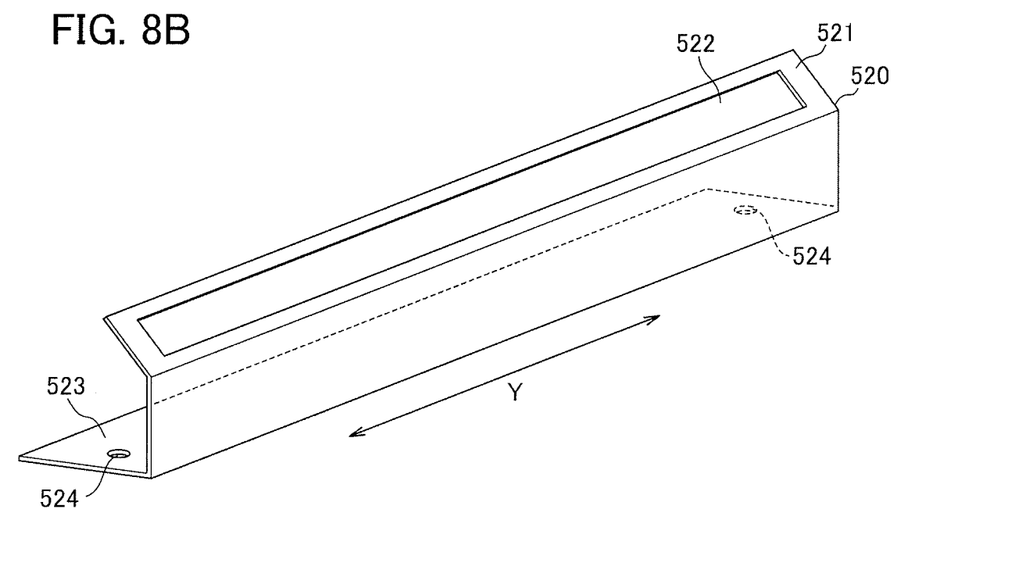
FIG. 8B is a perspective view of the attaching member.
Figure 8C:
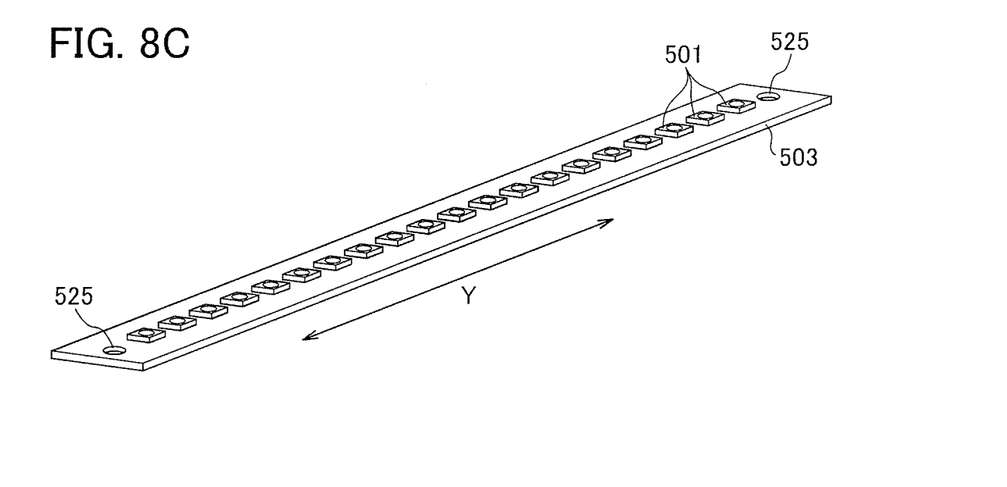
FIG. 8C is a perspective view of the LED unit in which second fixing holes are formed.

More specifically, an attaching member 520 as another attaching member is described with reference to FIGS. 8A to 8C. FIG. 8A is a diagram showing a state in which an LED unit 503 and the elliptical diffuser plate 507 are attached to an attaching member 520. FIG. 8B is a perspective view of the attaching member 520. FIG. 8C is a perspective view of the LED unit 503 on which second fixing holes 525 and 525 are formed.

In the illustrated embodiment as shown in FIGS. 8A to 8C, the attaching member 520, which includes: a first mounting portion 521 as the mounting portion, which is formed on a side to the subject G and on which the elliptical diffuser plate 507 is mounted; an opening portion 522 formed in the first mounting portion 521 so as to extend in the main scanning direction Y; a second mounting portion 523 on which the LED unit 503 is placed, which is disposed in parallel with the contact glass 335; and first fixing holes 524 and 524 that are formed in the second mounting portion 523 so as to position and fix the LED unit 503, may also be used as another attaching member.

The elliptical diffuser plate 507 is mounted on a subject G side of the first mounting portion 521. The opening portion 522 formed in the first mounting portion 521 is formed so that light guided from the plurality of LEDs by the light guiding body 505, to be input to the elliptical diffuser plate 507, can pass therethrough.

The LED unit 503 is attached to the attaching member 520 in a state of being mounted on the second mounting portion 523. More specifically, the LED unit 503 is fixed by a fastening member (not shown) in a state where the second fixing holes 525 and 525 formed in the LED unit 503 align with the first fixing holes 524 and 524 formed in the second mounting portion 523.

In the illustrated embodiment as shown in FIG. 8A, by attaching the LED unit 503 and the elliptical diffuser plate 507 on the high-rigidity attaching member 520, a positional relationship between the plurality of LEDs 501 and the elliptical diffuser plate 507 can be maintained appropriately. More specifically, the plurality of LEDs 501 and the elliptical diffuser plate 507 are appropriately maintained in a positional relationship where the light from the plurality of LEDs 501 is substantially uniform in the main scanning direction.

Figure 9A:
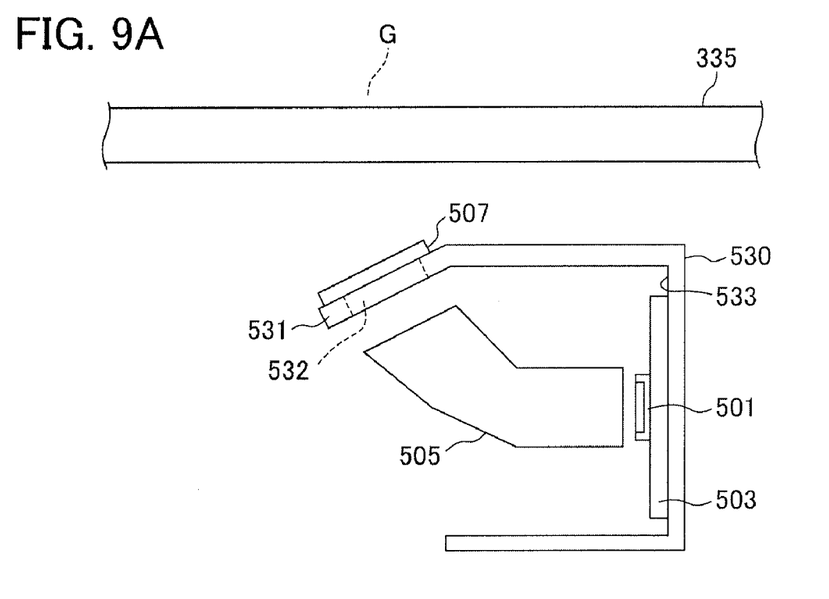
FIG. 9A is a diagram showing a state where the LED unit and the elliptical diffuser plate are attached to the attaching member.
Figure 9B:
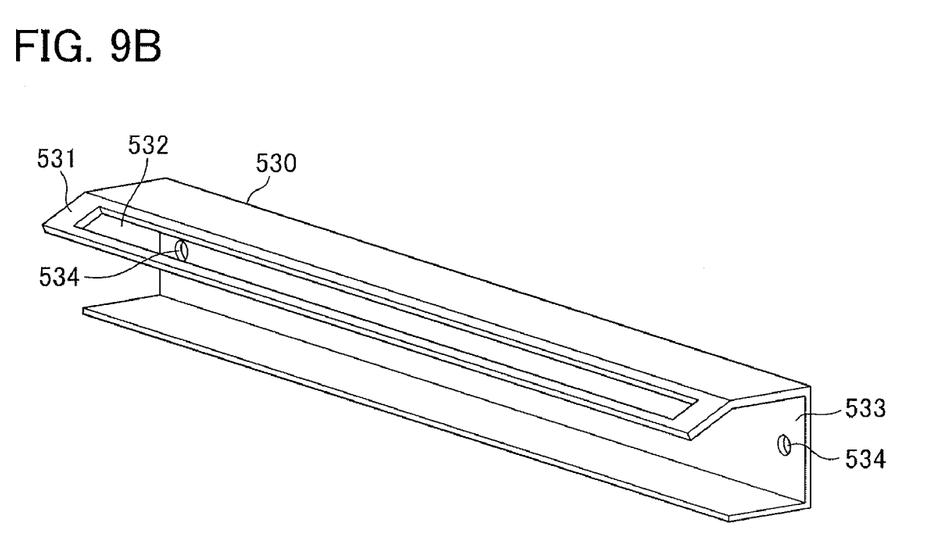
FIG. 9B is a perspective view of the attaching member.

Subsequently, some embodiments of an attaching member 530, as yet another attaching member, is specifically described with reference to FIGS. 9A and 9B. The illustrated embodiment as shown in FIG. 9A is a diagram showing a state in which the LED unit 503 and the elliptical diffuser plate 507 are attached to the attaching member 530. FIG. 9B is a perspective view of the attaching member 530.

In the illustrated embodiment as shown in FIGS. 9A and 9B, the attaching member 530, which includes: a second mounting portion 531 as the mounting portion, which is formed on a side to the subject G and on which the elliptical diffuser plate 507 is mounted; an opening portion 532 formed in the second mounting portion 531 so as to extend in the main scanning direction Y; an attaching portion 533 to which the LED unit 503 is attached, which is disposed vertically to the contact glass 335; first fixing holes 534, 534 that are formed in the attaching portion 533 so as to position and fix the LED unit 503, may also be used as yet another attaching member.

The elliptical diffuser plate 507 is mounted on a side to the subject G of the second mounting portion 531. The opening portion 532 formed in the second mounting portion 531 is formed so that light guided from the plurality of LEDs by the light guiding body 505, to be input to the elliptical diffuser plate 507, can pass therethrough.

The LED unit 503 is fixed by a fastening member (not shown) in a state where the second fixing holes 525 and 525 formed in the LED unit 503 (see FIG. 8C) align with the first fixing holes 534 and 534 formed in the attaching portion 533. With the above-mentioned attaching member 520, the plurality of LEDs 501 is disposed so as to face vertically upward; however, with the attaching member 530, the plurality of LEDs 501 is disposed so as to face the left side in a horizontal direction in FIG. 9A.

In the illustrated embodiment as shown in FIG. 9A, by attaching the LED unit 503 and the elliptical diffuser plate 507 on the high-rigidity attaching member 530, a positional relationship between the plurality of LEDs 501 and the elliptical diffuser plate 507 can be appropriately maintained. More specifically, the plurality of LEDs 501 and the elliptical diffuser plate 507 are appropriately maintained in a positional relationship where the light from the plurality of LEDs 501 is substantially uniform in the main scanning direction.

What is claimed is:

1. An image reading device comprising:
   an illumination portion that irradiates light onto a subject, wherein the illumination portion comprises a plurality of luminescence portions disposed at predetermined intervals in a main scanning direction and a diffuser plate disposed between the subject and the plurality of luminescence portions for diffusing the light emitted by the plurality of luminescence portions;
   at least one mirror that forms a light path by reflecting a luminous flux from the subject;
   an imaging lens that forms an image from the luminous flux reflected by the at least one mirror; and
   a reading portion that is disposed in an imaging position of the imaging lens, and reads an image of the subject on basis of image formation by the imaging lens;
   wherein each of the plurality of luminescence portions and the diffuser plate is attached to an attaching member that is integrally configured in a state maintaining a positional relationship where the light from the plurality of luminescence portions is substantially uniform in the main scanning direction, and
   wherein the attaching member has formed therein:
   a mounting portion that is disposed on a side to the subject and mounts the diffuser plate; and
   an opening portion that is formed on the mounting portion so as to extend in the main scanning direction, and through which light incident on the diffusing plate passes.

2. The image reading device according to claim 1, wherein the diffuser plate is an elliptical diffuser plate that diffuses the light emitted by the plurality of luminescence portions with a higher diffusion rate in the main scanning direction than in a sub-scanning direction.

3. The image reading device according to claim 1, wherein the illumination portion further comprises a light guiding body that is disposed between the plurality of luminescence portions and the diffuser plate.

4. The image reading device according to claim 1, wherein the diffuser plate is disposed at a position where a difference of intensity in the main scanning direction in light from the plurality of luminescence portions is smaller than in the absence of the diffuser plate.

5. The image reading device according to claim 4, wherein the diffuser plate is disposed at a position where the light from the plurality of luminescence portions is substantially uniform in the main scanning direction.

6. An image forming device comprising:
   an image reading device comprising an illumination portion that irradiates light onto a subject, wherein the illumination portion comprises a plurality of luminescence portions disposed at predetermined intervals in a main scanning direction and a diffuser plate disposed between the subject and the plurality of luminescence portions for diffusing the light emitted by the plurality of luminescence portions,
   at least one mirror that forms a light path by reflecting a luminous flux from the subject,
   an imaging lens that forms an image from the luminous flux reflected by the at least one mirror, and a reading portion that is disposed in an imaging position of the imaging lens, and reads an image of the subject on the basis of image formation by the imaging lens;

an image supporting body on a surface of which an electrostatic latent image is formed on basis of image information relating to the image of the subject that is read by the image reading device;

a developing unit that develops a toner image on the electrostatic latent image formed on the image supporting body;

a transfer portion that directly or indirectly transfers the toner image formed on the image supporting body to a predetermined paper; and a fixing portion that fixes the toner image transferred to the predetermined paper by the transfer portion, wherein each of the plurality of luminescence portions and the diffuser plate is attached to an attaching member that is integrally configured in a state maintaining a positional relationship where the light from the plurality of luminescence portions is substantially uniform in the main scanning direction, and wherein the attaching member has formed therein:

a mounting portion that is disposed on a side to the subject and configured to mount the diffuser plate thereto; and an opening portion that is formed on the mounting portion so as to extend in the main scanning direction, and through which light incident to the diffusing plate passes.

7. The image forming device according to claim 6, wherein the diffuser plate is an elliptical diffuser plate that diffuses the light emitted by the plurality of luminescence portions with a higher diffusion rate in the main scanning direction than in a sub-scanning direction.

8. The image forming device according to claim 6, wherein the illumination portion further comprises a light guiding body that is disposed between the plurality of luminescence portions and the diffuser plate.

9. The image forming device according to claim 6, wherein the diffuser plate is disposed at a position where a difference of intensity in the main scanning direction in light from the plurality of luminescence portions is smaller than in the absence of the diffuser plate.

10. The image forming device according to claim 9, wherein the diffuser plate is disposed at a position where the light from the plurality of luminescence portions is substantially uniform in the main scanning direction.

* * * * *